United States Patent [19]

Akikusa et al.

[11] Patent Number: 5,245,753
[45] Date of Patent: Sep. 21, 1993

[54] METHOD OF MANUFACTURING PRESSURE CONTROL VALVE

[75] Inventors: Hiroshi Akikusa, Ashikaga; Katsuya Shirasaki, Kiryu, both of Japan

[73] Assignee: Mitsuba Electric Manufacturing Co., Ltd., Gunma, Japan

[21] Appl. No.: 878,762

[22] Filed: May 5, 1992

[30] Foreign Application Priority Data

May 15, 1991 [JP] Japan .................. 3-139761

[51] Int. Cl.⁵ .............................. G05D 16/08
[52] U.S. Cl. .................. 29/890.124; 29/454
[58] Field of Search ............ 29/890.12, 890.124, 29/888.3, 421.1, 454

[56] References Cited

U.S. PATENT DOCUMENTS

| | | | |
|---|---|---|---|
| 3,302,269 | 2/1967 | Cooper et al. | 29/421.1 X |
| 3,545,070 | 12/1970 | Bauer | 29/454 |
| 3,935,626 | 2/1976 | Genbauff | 29/454 X |
| 3,999,266 | 12/1976 | Parker | 29/890.124 |
| 4,046,010 | 9/1977 | Akeley | 29/454 X |
| 4,178,666 | 12/1979 | Ando et al. | 29/454 X |
| 4,401,858 | 8/1983 | Reynard et al. | 29/454 X |
| 4,597,151 | 7/1986 | Zaghi et al. | 29/421.1 |
| 4,936,342 | 6/1990 | Kojima et al. | |

FOREIGN PATENT DOCUMENTS 1-138368  5/1989  Japan .

Primary Examiner—Joseph M. Gorski

[57] ABSTRACT

In a method of manufacturing a pressure control valve, wherein a fuel introduction path and a fuel discharge path are formed in a housing; a spherical valve body mounting portion is formed in the fuel discharge path; and a spherical valve body is mounted to the spherical valve body mounting portion, previously, an annular rib is formed on a diaphragm and an annular groove is formed on the housing. Thereafter, the annular rib of the diaphragm is coupled into the annular groove of the housing to position the diaphragm, and vacuum suction is performed from the fuel introduction path to thereby the pressure in the housing and attract a diaphragm unit to the housing. In this state, a case is put on the housing, and this case is caulked to simultaneously fix the diaphragm and the case to the housing.

5 Claims, 5 Drawing Sheets

METHOD OF MANUFACTURING PRESSURE CONTROL VALVE

BACKGROUND OF THE INVENTION

1. Field of the Invention

The invention relates to a method of manufacturing a pressure control valve, particularly to improvements in a process of assembling a diaphragm unit in the method of manufacturing the pressure control valve, and, for example, to the method of manufacturing the pressure control valve, which is effective for use in techniques of manufacturing a fuel pressure control valve for controlling a fuel supply flow rate in accordance with fuel pressure.

2. Related Art Statement

In general, in a vehicle such as a motor vehicle, there has been used a fuel pressure control valve provided with a diaphragm unit in a fuel supply path for delivering fuel in a fuel tank to an engine.

In the fuel pressure control valve as described above, a fuel introduction path and a fuel discharge path, which are communicated with a control valve chamber, are formed in a housing constituting the control valve chamber together with the diaphragm, and a valve body for controlling the flow of the fuel is mounted to the inlet side of the fuel discharge path in a manner to be interlocked with the diaphragm.

In the fuel pressure control valve as described above, heretofore, the diaphragm has been caulked and fixed, and thereafter, a return spring has been set on the diaphragm. Subsequently, a case is mounted to the housing in a manner to cover the diaphragm and a return spring, and a double caulking construction in which the case is caulked and fixed to the housing is adopted, as shown U.S. Pat. No. 4,936,342.

However, in this double caulking construction, a diaphragm holder as a part of the diaphragm unit is required, and also a special process for caulking the case to the housing is required, thereby disadvantageously lowering the workability.

Therefore, there has been proposed a single caulking construction in which the diaphragm and the return spring are caulked simultaneously. According to this single caulking construction, the diaphragm holder as the part of the diaphragm unit can be dispensed with, so that the special process for caulking the case to the housing can be dispensed with.

However, when the case is caulked to the housing, the diaphragm stays in a free state where the diaphragm is not positioned to the case and the housing, whereby a shift of position takes place between the diaphragm and the case, so that an end portion of the diaphragm is bitten into the case. As a result, fuel leakage may occur from the portion where the diaphragm is bitten into.

Then, as described in Japanese Patent Laid-Open No. 1-138368, such a manufacturing method is proposed that internal threads are formed on an armature (receiver); an externally threaded jig is inserted from the side of an atmospheric chamber of the case and threadably coupled to the internal threads of the armature; and the case is caulked to the housing in a state where this jig holds the diaphragm through the armature to position the diaphragm.

However, in the method in which the diaphragm is held by this jig and positioned, it is necessary to form the internal threads on the armature for supporting the diaphragm, and it is also necessary that the externally threaded jig is inserted through a pipe having negative pressure communicating with the atmospheric chamber of the case and the armature is positioned and held by use of this jig, so that such disadvantages are presented that not only the work is troublesome but also the positioning accuracy between the diaphragm and the case is lowered. Furthermore, a hole for receiving the jig is required at the top end of the case.

SUMMARY OF THE INVENTION

An object of the present invention is to provide a method of manufacturing a pressure control valve which can simultaneously fix the diaphragm and the case to the housing while preventing the diaphragm and the case from being shifted in position from each other.

According to the present invention, the method of manufacturing the pressure control valve, wherein a fluid introduction path and a fluid discharge path, which are communicated with a control valve chamber, are formed in a substantially cup-shaped housing constituting the control valve chamber together with a diaphragm; a valve body is interacted with the diaphragm for controlling a flow in the fluid discharge path; a valve body mounting portion mounted thereon with a valve body is formed on an inlet side of the fluid discharge path at a position to be faced to a diaphragm mounting opening portion; and a case is provided on a diaphragm mounting opening portion for covering a diaphragm, characterized in that an annular rib is bulgedly formed on the diaphragm, an annular groove to be coupled to the annular rib is formed on the surface of the diaphragm mounting opening portion of the housing, thereafter, either the fluid introduction path or the fluid discharge path is blocked, pressure in the housing is reduced by vacuum suction through the other path, while holding said blocked and pressure-reduced state, the annular rib of the diaphragm is coupled into the annular groove of the housing, a case is put on the housing, and further, an open end of the case is caulked to fix the case to the housing.

In the above-described method of manufacturing the pressure control valve according to the present invention, such an arrangement is adopted that the annular rib is formed on the diaphragm; the annular groove is formed on the surface of the diaphragm mounting opening portion of the housing; when the case is fixed to the housing the valve body is attracted by vacuum suction made from the outlet side of the fluid discharge path to reduce the pressure in the housing; the annular rib of the diaphragm is coupled into the annular groove of the housing; after the diaphragm is positioned the case is put on the housing; and this case is caulked to be fixed to the housing, so that the diaphragm and the case are prevented from being shifted in position, and that the diaphragm and the case can be simultaneously fixed to the housing.

BRIEF DESCRIPTION OF THE DRAWINGS

The above and other objects and features of the present invention will become apparent when referred to the following descriptions given in conjunction with the accompanying drawings, wherein like reference numerals denote like elements, and in which.

DETAILED DESCRIPTION OF THE PREFERRED EMBODIMENTS

Figure 6:
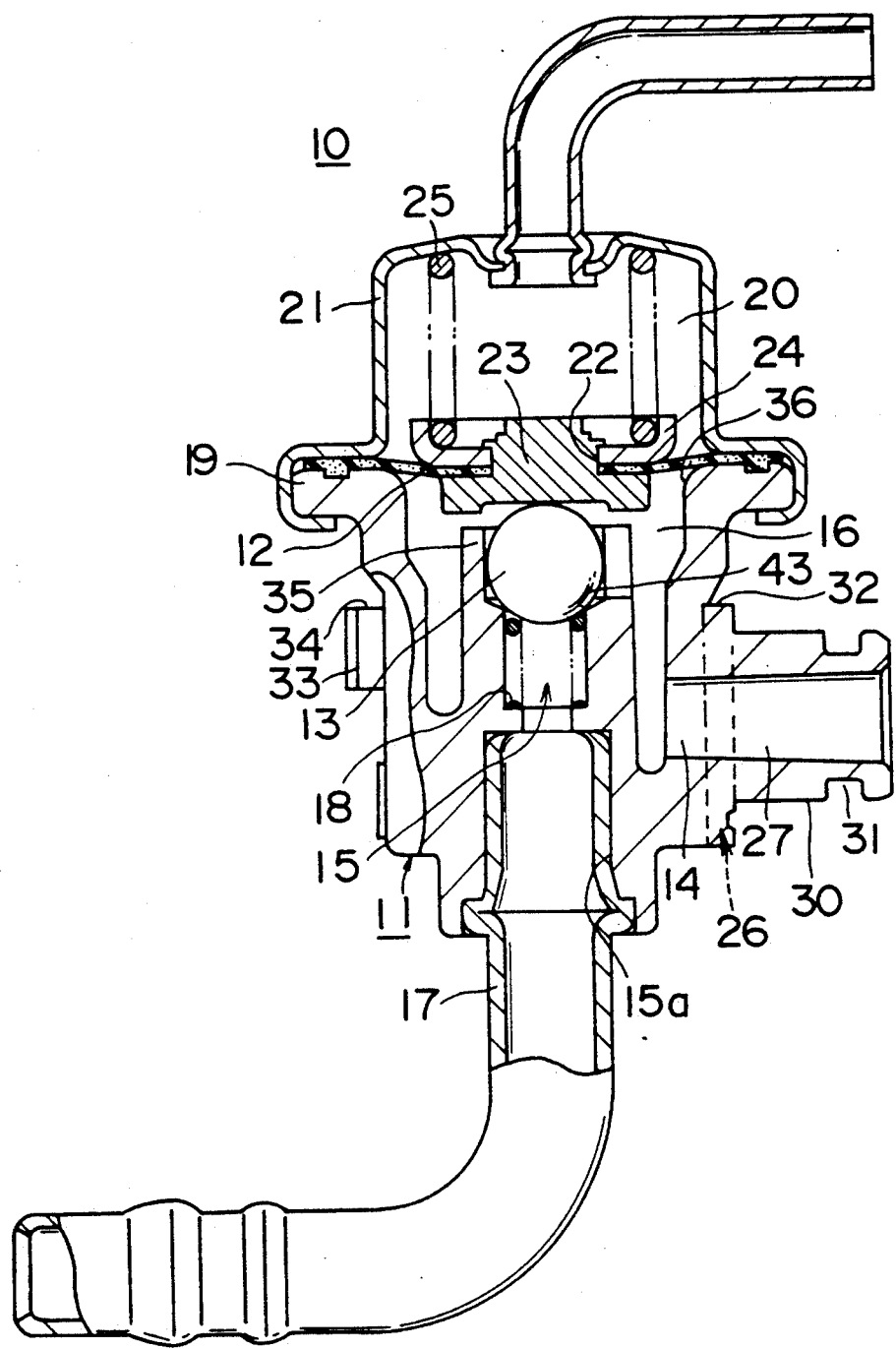
FIG. 6 is a side sectional view showing the fuel pressure control valve which has been manufactured.

Referring to the drawings, as shown in FIG. 6, a fuel pressure control valve 10 in this embodiment of the present invention comprises a substantially cup-shaped housing 11 produced by die cast, a diaphragm 12 and a spherical valve body 13. In the housing 11, a fuel introduction path 14 and a fuel discharge path 15 are opened, and a control valve chamber 16 is formed between the both paths 14 and 15. A pipe press-in opening 15a is formed at the outlet side of the fuel discharge path 15, and a return pipe 17 connected to a fuel tank is pressed into this pipe press-in opening 15a. A valve spring 18 formed of a coil spring is inserted in the intermediate portion of the fuel discharge path 15, and a spherical valve body 13 is mounted into the inlet side of the fuel discharge path 15. This spherical valve body 13 is formed of a steel ball which may be simply referred to as the "ball" and mounted to or removed from a valve seat surface 43 having a concaved spherical shape as will be described hereunder.

The diaphragm 12 defines a part of a wall surface of the control valve chamber 16 and is fixed to a flange portion 19 of the housing 11 together with a case 21 forming a negative pressure chamber 20. Opened in the central portion of this diaphragm 12 is a holding hole 22 in which a receiver 23 is mounted. An end of the receiver 23 is abutted against the spherical valve body 13, and the other end of the receiver 23 is solidly secured to a support plate 24 abutted against the diaphragm 12. A return spring 25 formed of a coil spring is confined between the support plate 24 and an end surface wall of the case 21 in an energy-stored state, and the diaphragm 12 is constantly urged toward the spherical valve body 13 through the biasing force of the return spring 25, to thereby constantly urge the spherical valve body 13 through the biasing force of the return spring 25 in the direction of blocking the inlet of the fuel discharge path 15.

Then, when the fuel is supplied into the control valve chamber 16 to raise the pressure in the control valve chamber 16, the diaphragm 12 is adapted to move toward the negative pressure chamber 20 against the biasing force of the return spring 25. At this time, the spherical valve body 13 is moved toward the diaphragm 12 through the biasing force of the valve spring 18 to leave the valve seat surface 43, whereby the inlet of the fuel discharge path 15 is opened. That is, the fuel introduction path 14 and the fuel discharge path 15 are brought into a valve opened state to be communicated with each other through the control valve chamber 16.

Figure 7:
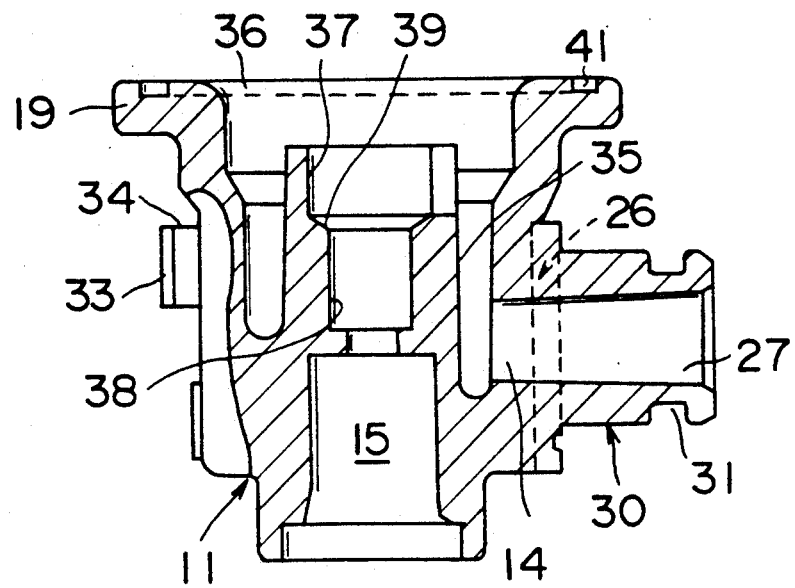
FIG. 7 is a side sectional view showing the housing.
Figure 8:
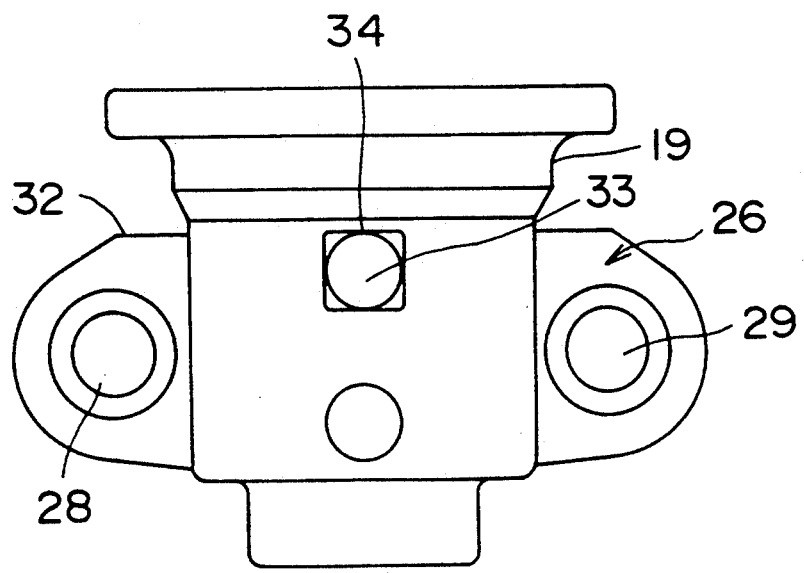
FIG. 8 is a rear view showing the housing.

Here, the arrangement of the housing prior to the assembling will be described. As shown in FIGS. 7 and 8, outside the housing 11, a mounting flange 26 for mounting this fuel pressure control valve 10 to a machine frame or the like is integrally formed by die cast, and this mounting flange 26 is integrally projected outside the fuel introduction path 14. This mounting flange 26 is formed to provide a substantially oval plate shape and bisymmetrically projected in a manner to perpendicularly intersect the center axis of the fuel introduction path 14. A through-hole 27 substantially constituting the fuel introduction path 14 is opened in the central portion of the mounting flange 26, and mounting holes 28 and 29 are opened at opposite sides of the through-hole 27 of the mounting flange 26. A connecting opening portion 30 is integrally formed in a cylindrical shape at the edge of the through-hole 27 of the mounting flange 26 and projected in a direction of perpendicularly intersecting this mounting flange 26, and a groove portion 31 for coupling a seal ring, not shown, is integrally formed at the forward end portion of this connecting opening portion 30.

A first seat surface 32 is formed in a plate shape on an end surface of the mounting flange 26 on the side of the diaphragm 12 in a manner to substantially perpendicularly intersect the axis of the pipe press-in opening 15a. Furthermore, a boss 33 is bulgedly formed on the rear surface of the housing 11 on the side opposite to the mounting flange 26, and a second seat surface 34 is formed in a plate shape on an end surface of this boss 33 on the side of the diaphragm 12 in a manner to substantially perpendicularly intersect the axis of the pipe press-in opening 15a, similarly to the first seat surface 32 of the mounting flange 26. Further, these first and second seat surfaces 32 and 34 constitute a surface coplanar with each other.

On the other hand, a pole portion 35 for constituting the fuel discharge path 15 is formed at a position to be faced to a diaphragm mounting opening portion 36 in the housing 11 produced by aluminium die cast. On the inner peripheral side of this pole portion 35, a spherical valve body mounting portion 37 and a valve spring mounting portion 38 are additionally provided in a manner to substantially form the fuel discharge path 15. The inner diameter of the spherical valve mounting portion 37 is set at a dimension substantially equal to the diameter of the spherical valve body (ball), so as to be able to receive the ball 13, and a tapered portion 39 is formed on the boundary between the valve spring mounting portion 38 and the spherical valve body mounting portion 37.

Figure 5:
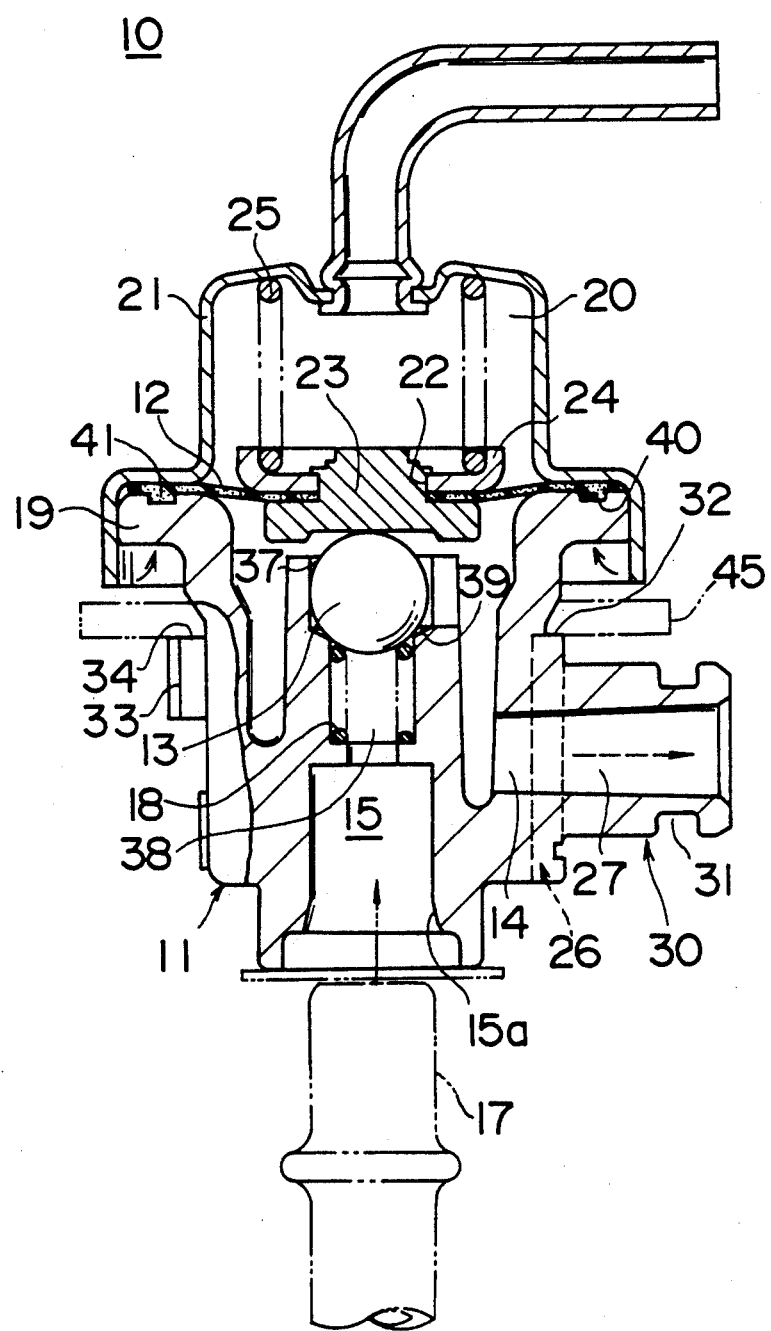
FIG. 5 is a side sectional view showing the caulking process.

Furthermore, as shown in FIGS. 7 and 5, a circular ring-shaped annular groove 41, into which a rib 40 of the diaphragm 12 can be pressed, is formed on the surface of the flange portion 19 of the housing 11 integrally formed by aluminium die cast. In passing, the rib 40 of the diaphragm 12 is integrally projected in a circular ring shape on the outer peripheral edge portion of the main inner surface of the diaphragm 12 integrally formed in a substantially disk shape, said rib 40 being coaxial therewith.

Description will hereunder be given of respective processes in which a concaved spherical valve seat surface is formed on the tapered portion 39 of the housing 11 produced by aluminium die cast having the above-described arrangement, and thereafter, the case 21 and the return pipe 17 are assembled to the housing 11, whereby the fuel pressure control valve 10 with the above-described arrangement is manufactured.

Figure 1:
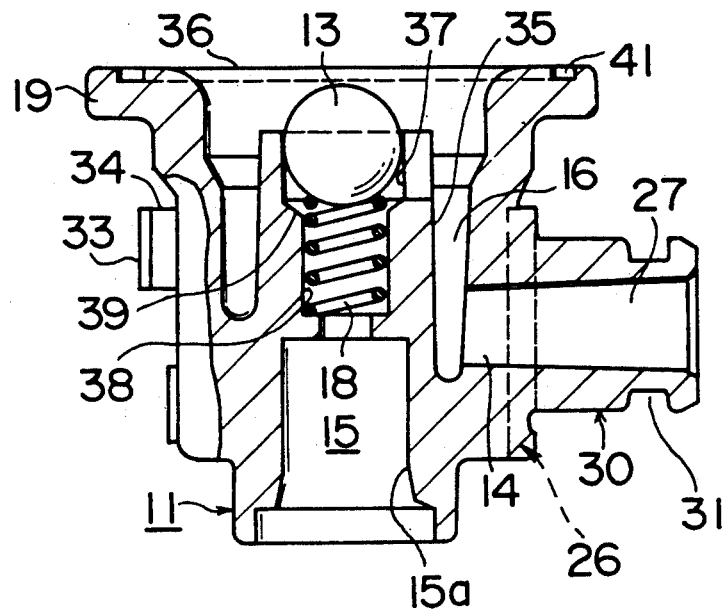
FIG. 1 is a side sectional view showing the process of mounting the valve spring and the spherical valve body in the method of manufacturing the fuel pressure control valve as an embodiment of the present invention.

First, as shown in FIG. 1, the valve spring 18 is inserted into the valve spring mounting portion 38 from the side of the diaphragm mounting opening portion 36 of the housing 11, and subsequently, the ball (steel ball) as being the spherical valve body 13 is inserted into the spherical valve body mounting portion 37.

Figure 2:
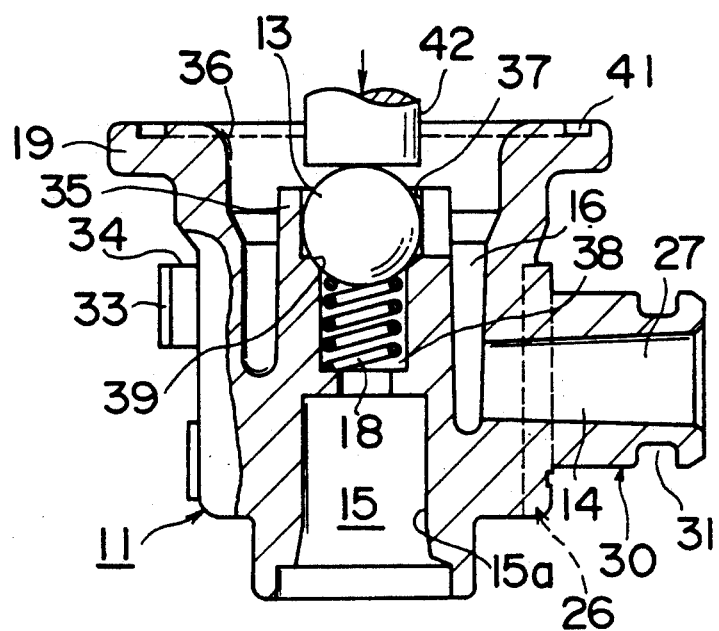
FIG. 2 is a side sectional view showing the process of forming the valve seat surface.

Next, as shown in FIG. 2, a cylindrical column-shaped jig 42 is inserted from the side of the diaphragm mounting opening portion 36 and the forward end of the jig 42 is brought into contact with the top surface of the spherical valve body 13. Then, the pressure is applied to the spherical valve body 13 through the jig 42, whereby punching is performed.

Figure 3:
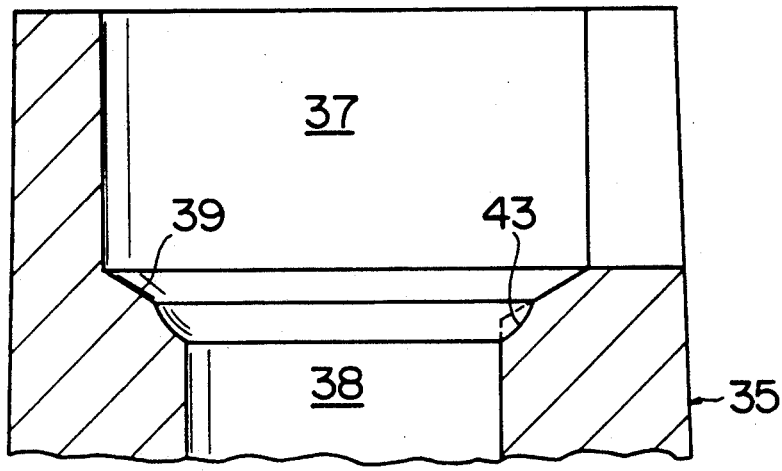
FIG. 3 is an enlarged partially sectional view showing the valve seat surface after forming.

By this punching, a concaved spherical valve seat surface 43 as shown in FIG. 3 is formed on the tapered portion 39. That is, the ball (steel ball) as being the spherical valve body 13 by itself is used as a jig for forming the valve seat surface 43, whereby the concaved spherical valve seat surface 43 is formed on the tapered portion 39 through this punching of the spherical valve body 13. With this operation, the valve seat surface 43 meeting a convexed spherical shape of the spherical valve body 13 is accurately formed on the tapered portion 39. At this time, the spherical valve body 13 is made of steel and the housing 11 is made of aluminium, so that the spherical valve body 13 can avoid being damaged.

Figure 4:
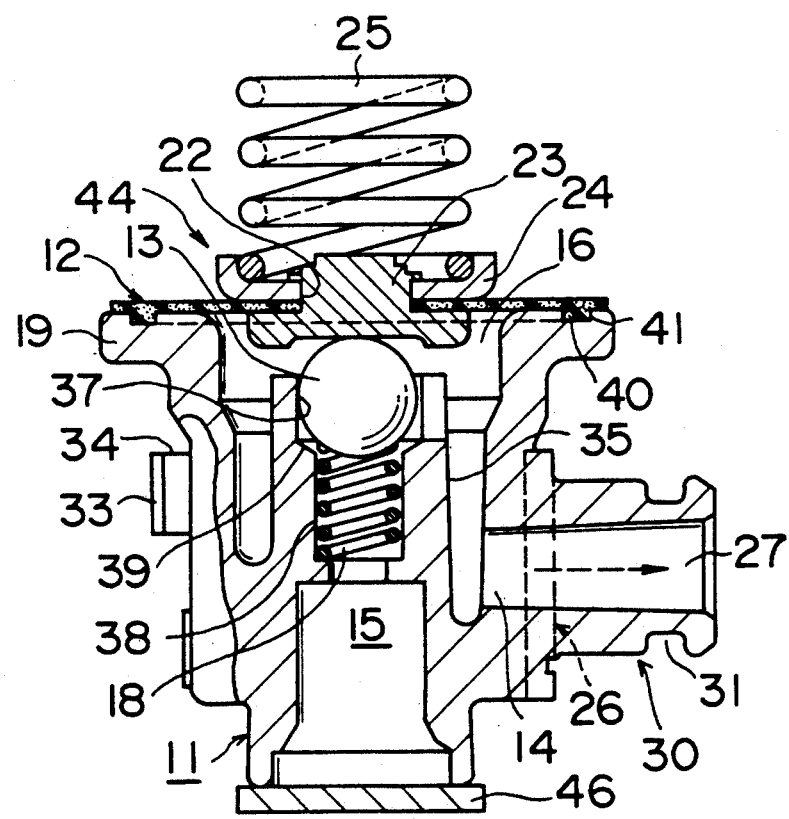
FIG. 4 is a side sectional view showing the process of assembling the diaphragm unit.

Next, as shown in FIG. 4, the diaphragm unit 4 is rested such that the rib 40 of the diaphragm 12 is coupled into the annular groove 41 in a state where the outlet of the fuel discharge path 15 is blocked by a suitable blocking member 46 and vacuum suction is performed from the fuel introduction path 14. At this time, the pressure is reduced in the housing 11, so that the diaphragm 12 is attached tightly to the flange portion 9 of the housing 11, thereby preventing the diaphragm unit 4 from being shifted by the valve spring 18 in the axial direction of the housing.

A diaphragm unit 44 is constructed such that the receiver 23 and the support plate 24 are fixed to the diaphragm 12 and the return spring 25 is fixed to the support plate 24, and previously assembled in a separate process.

Next, as shown in FIG. 5, the case 21 is put on the flange portion 19 of the housing 11 mounted thereon with the diaphragm unit 44 in a manner to cover the diaphragm unit 44 from above.

Subsequently, and end of the case 21 on the side of the opening end is caulked radially and inwardly, whereby the case 21 is fixed to the flange portion 19 of the housing 11.

In the covering and caulking processes of the case 21, the case 21 is put on and caulked in a state where vacuum suction is performed from the fuel introduction path 14 to couple the rib 40 of the diaphragm 12 into the annular groove 41 of the housing 11, whereby the diaphragm 12 is attracted to the flange portion 19, so that a phenomenon in which the diaphragm 12 is bitten in between the case 21 and the flange portion 19 can be prevented from occurring, thereby enabling to perform caulking in a stabilized state.

The case 21 is fixed to the housing 11 as described above, and thereafter, the vacuum suction is stopped. Then, as indicated by hypothetical lines in FIG. 5, a jig 45 is applied to the first seat surface 32 of the mounting flange 26 and to the second seat surface 34 of the boss 33, and the return pipe 17 is pressed into the pipe press-in opening 15a of the housing 11.

At this time, a reaction force due to the pipe press-in acts on the jig 45 through the first and second surfaces 32 and 34, so that stress due to the press-in of the return pipe 17 is prevented from acting on the diaphragm 12 and the like. Because of this, even when the return pipe 17 is pressed into the pipe press-in opening 15a of the housing 11 after the case 21 is fixed to the flange portion 19 of the housing 11, a set pressure set in the diaphragm 12 can be prevented from fluctuating.

Incidentally, the present invention should not be limited to the above embodiment, and, needless to say, can be modified variously within the scope of the invention.

For example, the method of manufacturing the fuel pressure control valve has been described in the above embodiment, however, the present invention is applicable to the general methods of manufacturing the pressure control valves used for other applications.

As has been described hereinabove, such an arrangement is adopted that the annular rib of the diaphragm is coupled into the annular groove of the housing to position the diaphragm when the case is fixed to the housing, and the case is put on the housing and this case is caulked to be fixed to the housing in a state where the diaphragm unit is attracted to the flange portion of the housing, so that the diaphragm and the case can be simultaneously fixed to the housing with no shift taking place between the diaphragm and the case.

What is claimed is:

1. A method of manufacturing a pressure controlled valve having a fluid introduction path and a fluid discharge path, which paths are communicated with a control valve chamber and are formed in a substantially cupped shaped housing having a diaphragm mounting opening, which housing together with a diaphragm covering said diaphragm mounting opening defines said control valve chamber; a valve body interacting with the diaphragm for controlling flow in the fluid discharge path; a valve body mounting portion mounted on the housing and supporting said valve body adjacent an inlet side of the fluid discharge path at a position adjacent said diaphragm mounting opening; a spring associated with said valve body and urging said valve body into engagement with said diaphragm; and a case associated with said housing and covering said diaphragm, said method comprising the steps of providing an annular rib on said diaphragm, forming an annular groove in said housing around said diaphragm mounting opening, which annular groove conforms to said annular rib of said diaphragm, blocking one of said paths and applying a vacuum suction to the other of said paths, and while maintaining the blocking of said one of said paths and the application of a vacuum suction to the other of said paths performing the three steps of placing said diaphragm onto said housing such that said diaphragm covers said diaphragm mounting opening with said annular rib being inserted into said annular groove of said housing, then placing said case onto said housing, and then caulking said case thereby fixing said case to said housing.

2. The method as set forth in claim 1, including the step of providing an opening in the central portion of said diaphragm, and mounting a receiver in said opening, which receiver is a body separate from said valve body.

3. The method as set forth in claim 2, including the step of mounting a support plate to said receiver and fixing a return spring to said support plate, said return spring after said caulking of said case being confined between said support plate and said case.

4. The method as set forth in claim 1, wherein said fluid discharge path has an outlet end formed with a pipe press-in opening, and including the step of after the caulking of said case to fix it to said housing, pressing a pipe into said pipe press-in opening.

5. The method as set forth in claim 1, including the step of providing an annular portion on said case which annular portion, after said caulking of said case, overlies said annular rib.

* * * * *